Sept. 23, 1930.   L. RUSSELL   1,776,375
FLOWER POT OR TUB
Filed Aug. 27, 1929
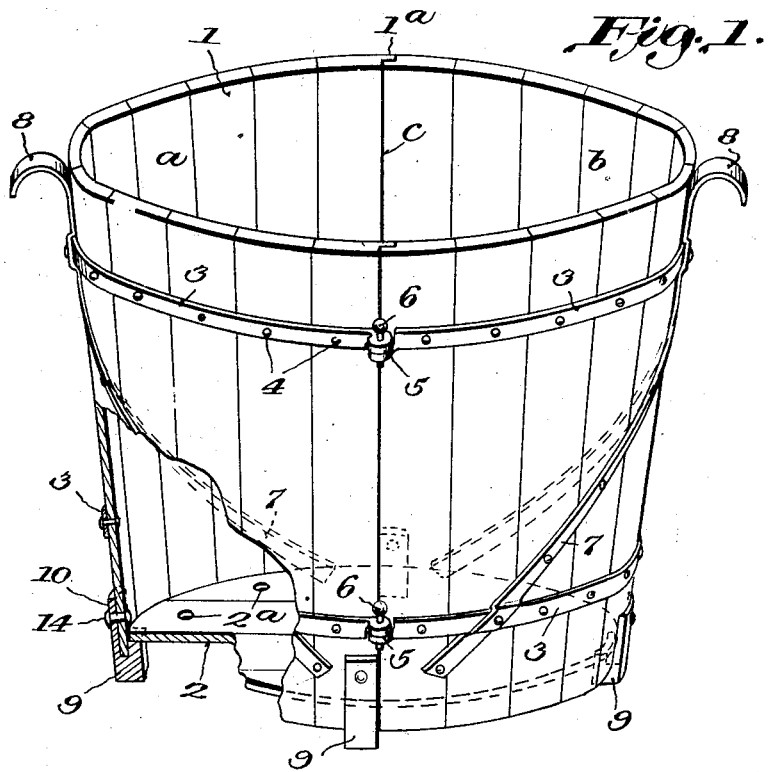
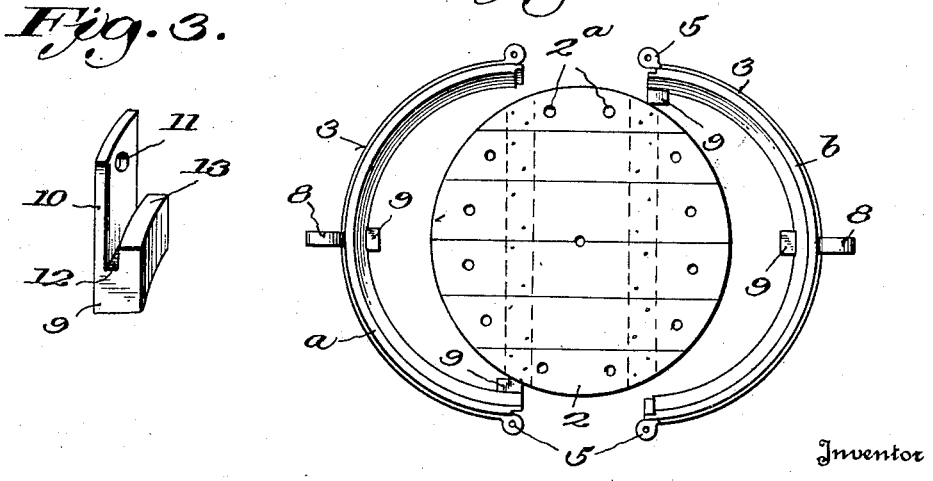
Inventor
Lois Russell,
By Herbert L. Davis,
Attorney Patented Sept. 23, 1930

1,776,375

UNITED STATES PATENT OFFICE

LOIS RUSSELL, OF BRACKNEY, PENNSYLVANIA

FLOWERPOT OR TUB

Application filed August 27, 1929. Serial No. 388,733.

This invention relates to wooden receptacles or tubs and more particularly to receptacles especially designed for use as flower pots.

Among the objects of the invention are to provide an article of this type, which shall be cheap in construction, non-breakable, capable of either resting on the floor or being suspended from above, and which can be divided into two separable sections in order to facilitate removal of a potted plant therefrom.

In order that the invention may be readily understood, reference is had to the accompanying drawing, forming part of this specification, and in which:—

Figure 1 is a perspective view of my improved flower pot or tub, parts being broken away and shown in section;

Figure 2 is a plan view on a reduced scale, showing how my improved flower pot can be divided at diametrically opposite points into two sections; and Figure 3 is a perspective view on an enlarged scale, showing one of the improved supporting feet.

Referring to the drawings in detail, my improved pot or tub is formed from wooden staves 1, in the usual or any desired manner, and is provided with a removable bottom 2, loosely fit in the lower end thereof. This bottom is preferably provided with drain holes 2ª.

The staves are held together by two or more hoops 3, and each stave is secured to these hoops by means of bolts or rivets 4.

Each hoop, at opposite sides of the tub, is provided with registering hinge eyes 5, and a removable pin 6 cooperates with each pair of eyes to hold the hoops together, as shown in Figure 1. When, however, the pins 6 are removed, it is obvious that the tub may be separated into two halves or sections a and b, as shown in Figure 2, these halves or sections fitting together at diametrically opposite points, as shown by the joint c, the staves adjacent this joint preferably being provided with notched or overlapping portions 1ª.

In order to be able to suspend the pot or tub from chains or the like, I provide it at opposite ends with hooks 8 formed at the upper ends of metal strips 7, which extend diagonally around each side of the tub and which are secured to the staves thereof by means of bolts or screws.

To the lower edge of the tub, I secure a plurality of combined feet and bottom supporting elements 9, each consisting of a flat portion 10, provided with a hole 11, and adapted to lie flat against the outside of the tub and to be secured thereto, as by means of a bolt or rivet 14, passing through the hole 11. Each foot 9 is further provided with an inwardly projecting portion 13, adapted to form a shoulder on which the edge of the bottom 2 rests, and between the shoulder 13 and the portion 10 is a groove 12, in which is received the lower edge of the adjacent stave, as clearly shown in Figures 1 and 3.

It will thus be seen that I have provided a very practical and convenient flower pot, which is non-breakable, which can be readily suspended from a chain or the like, and which may be easily separated into two halves or sections in order to facilitate removal of a potted plant therefrom. It will be further observed that these separable sections may be removed from around the contents of the pot while still permitting such contents to rest upon the bottom 2. In this way, breaking up of the earth surrounding the roots of a plant is prevented.

What I claim is:—

1. A flower pot made of wooden staves and having a pair of metal straps extending diagonally thereof at opposite sides, said straps being secured to the staves and each pair converging and terminating at their upper ends in a hook by which the pot may be suspended.

2. A flower pot comprising a tub formed of wood staves, a removable bottom fitting loosely in said tub, and a plurality of combined feet and bottom supports at the lower edge of the tub, each of said feet comprising a flat portion extending parallel with and secured to one of the staves, an inwardly projecting portion on which the bottom rests, and a groove in which the lower end of the adjacent stave is received.

In testimony whereof I affix my signature.

LOIS RUSSELL.